(12) United States Patent
Landman

(10) Patent No.: US 11,709,744 B2
(45) Date of Patent: *Jul. 25, 2023

(54) ACTIVE-ACTIVE ENVIRONMENT CONTROL

(71) Applicant: JFrog Ltd., Netanya (IL)

(72) Inventor: Yoav Landman, Netanya (IL)

(73) Assignee: JFrog Ltd., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/458,275

(22) Filed: Aug. 26, 2021

(65) Prior Publication Data

US 2021/0390023 A1 Dec. 16, 2021

Related U.S. Application Data

(63) Continuation of application No. 16/399,915, filed on Apr. 30, 2019, now Pat. No. 11,106,554.

(51) Int. Cl.
*G06F 17/00* (2019.01)
*G06F 11/20* (2006.01)
(Continued)

(52) U.S. Cl.
CPC ............ *G06F 11/2082* (2013.01); *G06F 8/60* (2013.01); *G06F 11/2076* (2013.01); *G06F 21/64* (2013.01); *H04L 9/0825* (2013.01)

(58) Field of Classification Search
CPC ............ G06F 11/2082; G06F 11/2076; G06F 11/1658; G06F 8/60; G06F 21/64;
(Continued)

(56) References Cited

U.S. PATENT DOCUMENTS 5,671,282 A 9/1997 Wolff et al.
5,915,238 A 6/1999 Tjaden
(Continued)

FOREIGN PATENT DOCUMENTS

WO WO-2012153173 A2 11/2012

OTHER PUBLICATIONS

Yoshida et al. "Understanding the Origins of Weak Cryptographic Algorithms Used for Signing Android Apps," 2018 $42^{nd}$ IEEE International Conference on Computer Software & Applications; 6 pages.

(Continued)

*Primary Examiner* — Greta L Robinson
(74) *Attorney, Agent, or Firm* — Norton Rose Fulbright US LLP

(57) ABSTRACT

The present disclosure provides a method, system, and device for security object synchronization at multiple nodes of an active-active environment. To illustrate, a source node may generate a corresponding security object sync request for each of multiple target nodes. The source node may send the security object sync request to the target nodes via a source queue and, for each target node, a corresponding distribution queue. A distribution queue may be closed based on an acknowledgement received from a corresponding target node, after a time period, or after a number of transmission attempts. A synchronization log may be maintained to indicate which security object sync requests have been delivered to which target nodes. In some implementations, the source node and the target nodes are part of an active-active environment that may be synchronized in time so the nodes resolve conflicts between received security object updates initiated from two different nodes.

20 Claims, 5 Drawing Sheets

(51) Int. Cl.
*G06F 21/64* (2013.01)
*H04L 9/08* (2006.01)
*G06F 8/60* (2018.01)

(58) Field of Classification Search
CPC ... G06F 21/44; H04L 9/0825; H04L 63/0823; H04L 63/108; H04L 63/10; H04L 63/20
See application file for complete search history.

(56) References Cited

U.S. PATENT DOCUMENTS

| | | | |
|---|---|---|---|
| 5,931,946 A | 8/1999 | Terada et al. | |
| 6,604,236 B1 | 8/2003 | Draper et al. | |
| 7,007,042 B2 | 2/2006 | Lubbers et al. | |
| 7,403,901 B1 | 7/2008 | Carley et al. | |
| 7,814,146 B2 | 10/2010 | Chavez et al. | |
| 7,987,368 B2 | 7/2011 | Zhu et al. | |
| 8,196,186 B2 | 6/2012 | Mityagin et al. | |
| 8,239,446 B2 | 8/2012 | Navar et al. | |
| 8,413,198 B2 | 4/2013 | Connor et al. | |
| 9,280,339 B1 | 3/2016 | Prunicki et al. | |
| 9,659,155 B2 | 5/2017 | Kosovan | |
| 9,819,665 B1 | 11/2017 | Machani | |
| 9,842,062 B2 | 12/2017 | Ford et al. | |
| 10,043,026 B1* | 8/2018 | Salour | G06F 16/2365 |
| 10,091,215 B1 | 10/2018 | Word | |
| 10,339,299 B1 | 7/2019 | Magnuson et al. | |
| 10,387,570 B2 | 8/2019 | VanBlon et al. | |
| 10,409,838 B1 | 9/2019 | George et al. | |
| 10,701,143 B1 | 6/2020 | Jha et al. | |
| 10,754,952 B2 | 8/2020 | Muller et al. | |
| 10,785,334 B2 | 9/2020 | Kristiansson et al. | |
| 10,812,975 B1 | 10/2020 | Easwar Prasad et al. | |
| 10,880,407 B2 | 12/2020 | Reynolds et al. | |
| 11,284,258 B1 | 3/2022 | Wei et al. | |
| 2002/0062439 A1 | 5/2002 | Cotugno et al. | |
| 2003/0220880 A1 | 11/2003 | Lao et al. | |
| 2004/0250115 A1 | 12/2004 | Gemmel et al. | |
| 2005/0071385 A1 | 3/2005 | Rao | |
| 2006/0107286 A1 | 5/2006 | Connor et al. | |
| 2006/0195816 A1 | 8/2006 | Grandcolas et al. | |
| 2007/0220575 A1 | 9/2007 | Cooper et al. | |
| 2007/0294686 A1 | 12/2007 | Oh | |
| 2009/0013317 A1 | 1/2009 | Abfalter et al. | |
| 2009/0119655 A1 | 5/2009 | Quilty | |
| 2009/0144340 A1 | 6/2009 | Ferguson et al. | |
| 2009/0210697 A1 | 8/2009 | Chen et al. | |
| 2009/0290715 A1 | 11/2009 | Mityagin et al. | |
| 2009/0313353 A1 | 12/2009 | Lou | |
| 2010/0223472 A1 | 9/2010 | Alvarsson | |
| 2010/0287363 A1 | 11/2010 | Thorsen | |
| 2011/0010258 A1 | 1/2011 | Chavez et al. | |
| 2011/0071841 A1 | 3/2011 | Fomenko et al. | |
| 2011/0072075 A1 | 3/2011 | Gautier | |
| 2011/0107419 A1 | 5/2011 | Vidal et al. | |
| 2011/0113012 A1 | 5/2011 | Gruhl et al. | |
| 2012/0131566 A1 | 5/2012 | Morgan et al. | |
| 2012/0151051 A1 | 6/2012 | Zhang et al. | |
| 2012/0159469 A1 | 6/2012 | Laor | |
| 2012/0233134 A1 | 9/2012 | Barton et al. | |
| 2012/0240096 A1 | 9/2012 | Sass | |
| 2012/0259920 A1 | 10/2012 | Mathieu et al. | |
| 2013/0081100 A1 | 3/2013 | Sreehari et al. | |
| 2013/0124807 A1 | 5/2013 | Nielsen et al. | |
| 2013/0132946 A1 | 5/2013 | Ma | |
| 2013/0268927 A1 | 10/2013 | Cochran | |
| 2014/0173024 A1 | 6/2014 | Burba et al. | |
| 2014/0245376 A1 | 8/2014 | Hibbert et al. | |
| 2015/0099510 A1 | 4/2015 | Shah et al. | |
| 2015/0172352 A1 | 6/2015 | Gopalakrishnan et al. | |
| 2015/0268881 A1 | 9/2015 | Nielsen et al. | |
| 2015/0301823 A1 | 10/2015 | Hatakeyama | |
| 2015/0302037 A1 | 10/2015 | Jackson et al. | |
| 2015/0341178 A1 | 11/2015 | Tanaka et al. | |
| 2015/0341325 A1 | 11/2015 | Al Jabri | |
| 2015/0350186 A1 | 12/2015 | Chan et al. | |
| 2016/0006837 A1 | 1/2016 | Reynolds et al. | |
| 2016/0117235 A1 | 4/2016 | Mishra et al. | |
| 2016/0124665 A1 | 5/2016 | Jain et al. | |
| 2016/0179867 A1 | 6/2016 | Li et al. | |
| 2016/0234237 A1 | 8/2016 | Thakar et al. | |
| 2016/0267101 A1 | 9/2016 | Clissold et al. | |
| 2016/0373440 A1 | 12/2016 | Mather et al. | |
| 2017/0003951 A1 | 1/2017 | Newell et al. | |
| 2017/0034023 A1 | 2/2017 | Nickolov et al. | |
| 2017/0060546 A1 | 3/2017 | Prasad et al. | |
| 2017/0147338 A1 | 5/2017 | Jackson et al. | |
| 2017/0262657 A1 | 9/2017 | Salmon-Legagneur et al. | |
| 2017/0264588 A1 | 9/2017 | Hunt et al. | |
| 2017/0300309 A1 | 10/2017 | Berger et al. | |
| 2017/0357496 A1 | 12/2017 | Smith et al. | |
| 2017/0371499 A1 | 12/2017 | Checkley et al. | |
| 2018/0240546 A1 | 8/2018 | Pfeiffer | |
| 2018/0260212 A1 | 9/2018 | Wisnovsky | |
| 2018/0373517 A1 | 12/2018 | Hu | |
| 2019/0014161 A1 | 1/2019 | Doar et al. | |
| 2019/0050576 A1 | 2/2019 | Boulton | |
| 2019/0080080 A1 | 3/2019 | Ogura et al. | |
| 2019/0130114 A1 | 5/2019 | Smith et al. | |
| 2019/0138287 A1 | 5/2019 | De Capoa et al. | |
| 2019/0205121 A1 | 7/2019 | Ericson | |
| 2019/0303623 A1 | 10/2019 | Reddy et al. | |
| 2019/0306173 A1 | 10/2019 | Reddy et al. | |
| 2019/0332367 A1 | 10/2019 | Navarrete Michelini et al. | |
| 2020/0012441 A1 | 1/2020 | Chheda et al. | |
| 2020/0076618 A1 | 3/2020 | Driever et al. | |
| 2020/0076807 A1 | 3/2020 | Driever et al. | |
| 2020/0084202 A1 | 3/2020 | Smith et al. | |
| 2020/0162543 A1 | 5/2020 | Mosko et al. | |
| 2020/0177397 A1 | 6/2020 | Harrington | |
| 2020/0186505 A1 | 6/2020 | Amar et al. | |
| 2020/0213144 A1 | 7/2020 | Maloy | |
| 2020/0351089 A1 | 11/2020 | Wentz | |
| 2020/0372183 A1 | 11/2020 | Rangaiah et al. | |
| 2020/0409986 A1 | 12/2020 | Soroushian et al. | |
| 2020/0412691 A1 | 12/2020 | Shribman et al. | |
| 2021/0111875 A1 | 4/2021 | Le Saint | |
| 2021/0218800 A1 | 7/2021 | Landman | |

OTHER PUBLICATIONS

Patent Cooperation Treaty, International Search Report and Written Opinion issued for PCT Application No. PCT/IB2020/056777, dated Oct. 19, 2020, 15 pages.
Jana et al. "Management of Security and Privacy Issues of Application Development in Mobile Cloud Environment: A Survey," IEEE International Conference on Recent Advances and Innovations in Engineering, May 2014, 6 pages.
Li et al. "A Quantitative and Comparative Study of Network-Level Efficiency for Cloud Storage Services," ACM Trans. Model. Perform. Eval. Comput. Syst., vol. 4, No. 1, Article 3, 2019, 32 pages.
Patent Cooperation Treaty, International Search Report and Written Opinion issued for PCT Application No. PCT/IB2020/056776, dated Feb. 22, 2021, 10 pages.
Post, H. et al., "Linking Functional Requirements and Software Verification," 2009 17th IEEE International Requirements Engineering Conference, 2009, 8 pages.

* cited by examiner

ACTIVE-ACTIVE ENVIRONMENT CONTROL

CROSS-REFERENCE TO RELATED APPLICATIONS

The present application is a continuation of U.S. patent application Ser. No. 16/399,915 filed Apr. 30, 2019 and entitled "ACTIVE-ACTIVE ENVIRONMENT CONTROL"; and is related to U.S. patent application Ser. No. 16/399,905 filed Apr. 30, 2019 and entitled "DATA BUNDLE GENERATION AND DEPLOYMENT"; U.S. patent application Ser. No. 16/399,938 filed Apr. 30, 2019 and entitled "DATA FILE PARTITION AND REPLICATION"; and U.S. patent application Ser. No. 16/399,953 filed Apr. 30, 2019 and entitled "DATA FILE PARTITION AND REPLICATION"; the contents of each of which are incorporated by reference herein in their entirety.

TECHNICAL FIELD

The present application is generally related to the technical field of active-active environments, and more particularly, but not by way of limitation, to techniques for active-active environment control, such as synchronization of security object information.

BACKGROUND

Computer systems and software have become an integral part of modern society and affect a variety of aspects of daily life. Software can be developed as a monolith, such as one piece of software, or as a service-oriented architecture where each piece of software provides a specific service and multiple pieces of software operate together. Additionally, software can be updated to add or remove functionality, to correct bugs (e.g., critical/functional issues), and/or to address security issues. Developing and updating software can occur at multiple locations (e.g., different local development environments) around the globe, with each location needing access to the same files/software. Accordingly, each of the multiple locations may be part of an active-active environment in which multiple nodes are concurrently running the same type of service. When an organization has development teams across the world, external and internal dependencies of files and/or software can be maintained locally at different locations/nodes to promote development productivity. However, synchronizing files between multiple locations/nodes can be time consuming depending on a file size, a network topology, and/or a development methodology. Additionally, maintaining availability between files and/or software at multiple locations/nodes can be hindered by network latency and bandwidth limitations.

Additionally, synchronizing security objects in an active-active environment poses multiple challenges. To illustrate, each location/node of the active-active environment needs to be able to update security objects, such as users, groups, tokens, certificates, keys, etc. Further, one or more security objects updated by one location/node need to be propagated to one or more other locations/nodes. However, synchronization of security objects, via a network, in an active-active environment presents its own challenges. For example, two different locations can initiate security object updates close in time, thereby create creating a potential conflict of which location's update should be propagated and/or implemented at the multiple locations/nodes. Additionally, the network may have insufficient bandwidth or add latency, each of which further attributes to conflicts between updates from different locations/nodes. Thus, an active-active environment poses several challenges to provide and maintain synchronization of security objects for operating multiple locations/nodes.

BRIEF SUMMARY

Embodiments of the present disclosure provide systems, methods, and computer-readable storage media that provide for security object synchronization at multiple nodes of an active-active environment. For example, a source node may receive a user instruction to synchronize one or more target nodes. Based on the user instruction, the source node may generate a corresponding security object sync request for each of the one or more target nodes. To send the security object sync request to the one or more target nodes, the source node may utilize a distribution structure that includes a source queue and, for each target node, a corresponding distribution queue. A distribution queue may be closed based on an acknowledgement received from a corresponding target node, after a time period, or after a number of sync request transmission attempts. To illustrate, if the source node does not receive an acknowledgment from a target node, the source node may resend the security object sync request one or more times during a time period or up to a threshold number of transmission attempts. In some implementations, sending and/or resending of the security object sync request may incorporate and/or account for an additional user instructions and/or additional security object sync requests, which may reduce transmission overhead between nodes and promote network efficiency. In some implementations, the security object sync requests may be encoded, such as through use of a token, to provide security and enable authentication by the one or more target nodes. A synchronization log may be maintained to indicate which security object sync requests have been delivered to which target nodes. For example, the synchronization log may be updated responsive to an acknowledgement received from a target node indicting that a security object sync request was received. In some implementations, the source node and the target nodes are part of an active-active environment that may be synchronized in time so the nodes resolve conflicts between received security object updates initiated from two different nodes.

Thus, the systems, methods, and computer-readable storage media described support an active-active environment synchronization of security objects for operating multiple locations/nodes efficiently and securely. The source node may utilize the distribution structure to enable the source node to track the sending of security object sync requests and identify which security object sync requests have been received. In some implementations, the source node may resend a security object sync request to a target node if the source node has not received an acknowledgement that the security object sync request was received. In some such implementations, resending of the security object sync request may advantageously incorporate and/or account for an additional synchronization update, which may reduce transmission overhead between nodes. Additionally, a synchronization log may be maintained to monitor/track which synchronization updates are received by which nodes. In implementations where the source node and the target nodes are part of an active-active environment and are synchronized in time, one or more nodes may beneficially be able to resolve, without contacting another node, conflicts between multiple received security object updates initiated from two different nodes based on indications of when the multiple received security object updates were generated/transmitted. Thus, synchronization of security objections can be maintained across multiple local development environments of an active-active environment in situations where bandwidth limitation and/or latency of a network are present. Accordingly, users of different nodes (e.g., servers) may each work on files in their own environments, and security objects, such as users, groups, permissions, API keys, etc., may be synchronized between each node.

According to one embodiment, a method for security object synchronization in an active-active environment is described. The method includes receiving, at a source node, a user instruction. The user instruction includes an instruction to synchronize one or more target nodes executing an instance of an application. The method includes, in response to receiving the user instruction, identifying one or more target nodes to receive a security object sync request from the source node. The method includes initializing, at the source node, a distribution structure. The distribution structure includes a source queue and, for each identified target node, a corresponding distribution queue. The method includes generating, at the source node, for each identified target node, a corresponding security object sync request. The method includes transmitting, via the source queue and the distribution queue corresponding to each identified target node, the corresponding security object sync request. The method further includes updating a synchronization log corresponding to each identified target node. Updating the synchronization log includes recording an acknowledgement of receipt of sync request. The acknowledgement is received from at least one of the identified target nodes.

According to yet another embodiment, a system for security object synchronization in an active-active environment is described. The system includes at least one memory storing instructions and one or more processors coupled to the at least one memory. The one or more processors are configured to execute the instructions to cause the one or more processors to receive, at a source node, a user instruction. The user instruction includes an instruction to synchronize one or more target nodes executing an instance of an application. The one or more processors are configured to, in response to receiving the user instruction, identify one or more target nodes to receive a security object sync request from the source node. The one or more processors are configured to initiate, at the source node, a distribution structure. The distribution structure includes a source queue and, for each identified target node, a corresponding distribution queue. The one or more processors are configured to generate, at the source node, for each identified target node, a corresponding security object sync request. The one or more processors are configured to transmit, via the source queue and a distribution queue corresponding to each identified target node, the corresponding security object sync requests. The one or more processors are further configured to update a synchronization log corresponding to each identified target node. Updating the synchronization log includes recording an acknowledgement is received from at least one of the identified target nodes.

According to another embodiment, a computer program product is described that includes a computer-readable storage device, such as a non-transitory computer-readable storage medium, that includes instructions that, when executed by one or more processors, cause the one or more processors to perform operations for security object synchronization in an active-active environment. The operations include executing a first routine to identify one or more target nodes to receive a security object sync request from a source node in an active-active environment. The operations further include executing a second routine to initiate a distribution structure from the source node based on the identified one or more target nodes. The distribution structure includes a source queue and, for each of the one or more target nodes, a corresponding distribution queue. The operations also include executing a third routine to generate, four each of the one or more target nodes, a corresponding security object sync request based on a synchronization log maintained at the source node. The operations include executing a fourth routine to send to each target node of the one or more target nodes the corresponding security object sync request via the source queue and the distribution queue for the target node. The operations further include executing a fifth routine to update the synchronization log for each target node based on whether an acknowledgement is received from the target node responsive to the corresponding security object.

The foregoing has outlined rather broadly the features and technical advantages of the present disclosure in order that the detailed description of the invention that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which.

DETAILED DESCRIPTION OF THE INVENTION

Figure 1:
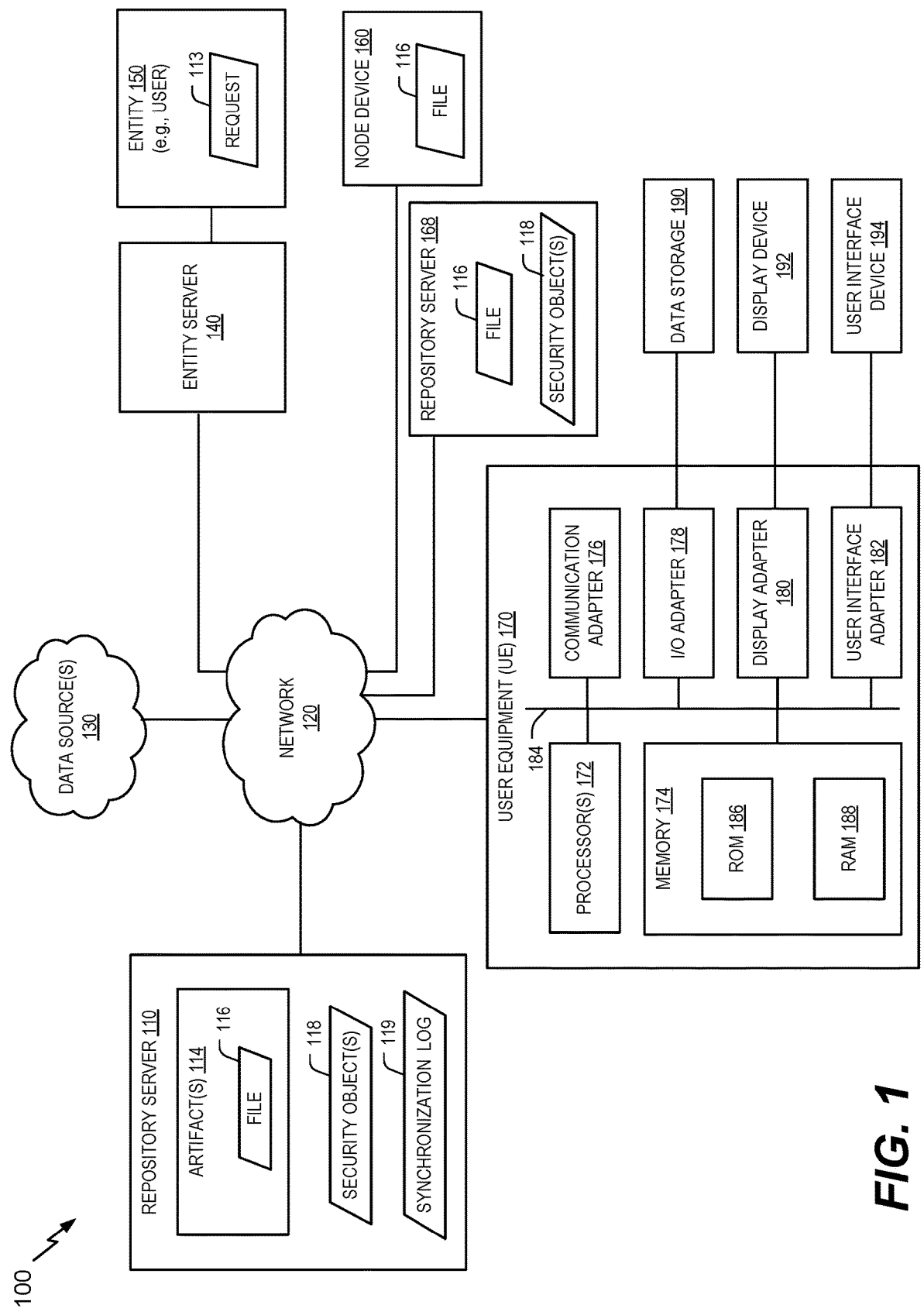
FIG. 1 is a block diagram of an example of a system that includes a server for synchronization of a security object in an active-active environment.

Inventive concepts utilize a system to provide security object synchronization at multiple nodes of an active-active environment. To illustrate, the multiple nodes may include a source node and one or more target nodes. The source node may receive a user instruction to synchronize one or more target nodes. For example, the user instruction may correspond to a synchronization of a security object, such as users, groups, permissions, API keys, tokens, etc. Based on the user instruction, the source node may generate a corresponding security object sync request for each of the one or more target nodes. To send the security object sync request to the one or more target nodes, the source node may utilize a distribution structure that includes a source queue and, for each target node, a corresponding distribution queue. In some implementations the distribution structure comprises a logical/virtual structure of one or more queues, such as a hierarchical structure in which each distribution queue stems from the source queue. A synchronization log corresponding to the one or more target nodes may be maintained to indicate which target nodes received the security object sync request. To illustrate, the synchronization log may be updated to record which target nodes the source node received an acknowledgement from. Accordingly, based on the user instruction, security object sync requests can be sent to the one or more target nodes in an active-active environment and, as part of the synchronization, the synchronization log is updated. Thus, users of different nodes (e.g., servers) may each work on files in their own environments, and security objects, such as users, groups, permissions, API keys, etc., may be synchronized between the nodes.

Embodiments also provide that the source node may utilize the distribution structure to enable the source node to track the sending of security object sync requests and identify which security object sync requests have been received. For example, a distribution queue may be closed based on an acknowledgement received from a corresponding target node, after a time period, or after a number of transmission attempts. To illustrate, if the source node does not receive an acknowledgment from a target node, the source node may resend the security object sync request one or more times during a time period or up to a threshold number of transmission attempts. In some such implementations, resending of the security object sync request may advantageously incorporate and/or account for an additional synchronization update, which may reduce transmission overhead between nodes. Additionally, the source queue may be closed based on each of the corresponding distributions nodes being closed. Accordingly, the distribution structure utilized by the source node enables efficient distribution and tracking of a synchronization update.

In some embodiments, sending and/or resending of a security object sync request may incorporate and/or account for an additional user instructions and/or additional security object sync requests. For example, during one or more attempts to communicate a first security object sync request to a target node, a source node may receive an additional user instruction and/or an additional security object sync request. The source device may update the security object sync request based on the additional user instruction and/or such additional security object sync request. Accordingly, the source device does not have to initiate or utilize another distribution structure for the additional user instruction and/or the additional security object sync request. By incorporating and/or accounting for the additional user instructions and/or additional security object sync requests, a transmission overhead between nodes may be reduced and an amount of time to distribute the user instructions and/or additional security object sync requests may be reduced. Additionally, or alternatively, incorporating and/or accounting for the additional user instructions and/or additional security object sync requests may promote network efficiency.

Embodiments herein also provide that the security object sync requests may be encoded. For example, the source device may attach a token to a security object sync request to encode the security object sync request. Encoding the security object sync request (e.g., attaching the token) enables a target to authenticate a source of the security object sync request. In the event that the target device is unable to authenticate the source of the security object sync request, the target device can discard the security object sync request. Accordingly, encoding the security object sync request provides and/or improves secure transmission of the security object sync request and incorporation of one or more authorized security objects by the target device.

In some embodiments, the source node and the one or more target nodes (of an active-active environment) may be synchronized in time so the nodes resolve conflicts between received security object updates initiated from two different nodes. To illustrate, a target node may receive a first sync request corresponding to a first time from a first source and a second sync request corresponding to a second time from a second source. The target node may determine a difference between the first time and the second time, determine which of the first sync request and the second sync request is "older", and/or determine which of the first sync request and the second sync request is "most recent". In some implementations, the target node compares the difference to a threshold (e.g., one second, multiple seconds, thirty seconds, one minute, etc.). If the difference is less than or equal to the threshold, the target node discards the most recent sync request and applies the older sync request. Alternatively, if the difference is greater than the threshold, the target node applies the older sync request followed by the most recent sync request. In situations where the target device has already applied a most recent sync request before receiving an older sync request, the target device may selectively apply the older sync request based on the most recent sync request, or may apply the older sync request and then reapply the most recent sync request. Accordingly, the target node may beneficially be able to resolve, without contacting another node, conflicts between multiple received security object sync requests initiated from two different nodes based on indications when the multiple received security object updates were generated/transmitted.

The foregoing features provide a system for an active-active environment in which synchronization of security objects for operating multiple locations/nodes is efficiently and securely maintained. For example, synchronization of security objections can be maintained at multiple local development environments of an active-active environment in situations where bandwidth limitation and/or latency of a network are present. Accordingly, users of different nodes (e.g., servers) may each work on files in their own environments, and security objects, such as users, groups, permissions, API keys, etc., may be synchronized between each node.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Referring to FIG. 1, a block diagram of a system that includes a server performing security object synchronization in an active-active network is shown and designated 100. An active-active network may refer to a network in which multiple nodes (e.g., servers) each execute their own environment. In such a network, security objects can be synchronized, as further described herein. System 100 includes a server 110 (e.g., a first repository server), a network 120, data sources 130, an entity server 140, an entity 150, a node device 160, a server 168 (e.g., a second repository server), and user equipment 170.

Server 110 may include one or more servers that, according to one implementation, are configured to perform several of the functions and/or operations described herein. One or more of the servers comprising server 110 may include memory, storage hardware, software residing thereon, and one or more processors configured to perform functions associated with system 100, as described further herein at least with reference to FIGS. 2 and 3. One of skill in the art will readily recognize that different server and computer architectures can be utilized to implement server 110, and that server 110 is not limited to a particular architecture so long as the hardware implementing server 110 supports the functions of the repository system disclosed herein. As shown in FIG. 1, user equipment can be used to enable an owner and/or administrator of repository server 110 to access and modify aspects (e.g., instructions, applications, data) of repository server 110. For example, components comprising user equipment 170, such as one or more processors 172, can be used to interface with and/or implement the server 110. Accordingly, user equipment 170 (e.g., a user station) may serve as a repository portal by which a user may access a repository system, such as a universal artifact repository, disclosed herein. For example, an artifact repository system may include server 110 (e.g., a first server) and server 168 (e.g., a second server). The portal can function to allow multiple users, inside and outside system 100 (e.g., at multiple instances of user equipment 170), to interface with one another. Additionally, it is noted that the one or more components described with reference to user equipment 170 may also be included in one or more of repository server 110, entity server 140, entity 150, node device 160, and/or server 168.

As shown, server 110 includes one or more artifacts 114, one or more security objects 118, and a synchronization log 119. Artifacts may include one or more binaries (e.g., a computer file that is not a text file). For example, the one or more artifacts 114 may include a file, such as a representative file 116. The artifacts may correspond to one or more package types. For example, a first artifact may correspond to a first package type, such as Maven, and a second artifact may correspond to a second package type, such as Bower. Security objects 118 may include or correspond to any objects or configurations that are associated with the security of artifacts 114, system 100, or both. For example, security objects 118 may include or correspond to users, groups, permissions, application program interface (API) keys, tokens, or any combination thereof, as non-limiting examples. Synchronization log 119 may include a log of synchronization operations that have been performed at one or more target nodes (e.g., servers, node devices, etc.). For example, each time a synchronization of a security object is successfully performed at another device, an indication of the synchronization operation may be stored in synchronization log 119. Thus, synchronization log 119 may, for one or more devices, indicate changes to security objects that have occurred, the time the changes occurred, the system that initiated the performance (e.g., server 110), or other information. In a particular implementation, a particular device (e.g., server 110) is designated to store synchronization log 119. In other implementations, other devices, such as server 168, entity server 140, or others may also store corresponding synchronization logs.

Network 120, such as a communication network, may facilitate communication of data between server 110 and other components, servers/processors, and/or devices. For example, network 120 may also facilitate communication of data between server 110 and one or more data sources 130, entity server 140, a node device 160, server 168, or any combination therefore. Network 120 may include a wired network, a wireless network, or a combination thereof. For example, network 120 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

Data sources 130 include the sources from which server 110 collects information. For example, data sources may include one or more reciprocities of artifacts, such as open source artifacts, vulnerability data, and/or license data, as illustrative, non-limiting examples.

Entity server 140 may include one or more servers which entity 150 uses to support its operations. Entity 150 may include any individual, organization, company, corporation, department (e.g., government), or group of individuals. For example, one entity may be a corporation with retail locations spread across multiple geographic regions (e.g., counties, states, or countries). As another example, another entity may be a corporation with cruise ships. As another example, another entity may be a group of one or more individuals. In a particular implementation, entity 150 includes a business and at least one user who can access server 110. For example, the user may access server 110 via an application, such as an application hosted by server 110. To illustrate, the user may have an account (e.g., on behalf of entity 150) and may log in to server 110 via the application. Although system 100 shows one entity 150, in other implementations, system 100 includes multiple entities. In a particular implementation, the multiple entities may include a first entity and a second entity, as described further herein at least with reference to FIG. 2. In such implementations, the first entity and the second entity may be the same entity (e.g., part of the same company) or may be different entities.

In some implementations, entity 150 is configured to add, modify, and/or access one or more artifacts (e.g., 114) at server 110. In some implementations, entity 150 is configured to generate (or initiate generation of) a release list of one or more files (e.g., artifacts) to be included in a software release (e.g., a software deployment). For example, a release list may correspond to a build job. In some implementation, entity 150 provides the release list to server 110 to cause server 110 to initiate a software release. In other implementations, entity 150 provides a query and/or one or more parameters for a query which is performed by server 110 to generate the release list at server 110. To illustrate, entity 150 initiates a query by server 110 to identify one or more files corresponding to a particular build job identifier. Additionally, entity 150 may identify one or more node devices (e.g., 160) to receive the software deployment. Additionally, or alternatively, entity 150 may add, modify, and/or access one or more security objects and identify one or more security objects to be synchronized to one or more target nodes, as further described herein.

Node device 160 includes one or more files, such as file 116. In some implementations, node device 160 may include or correspond to entity 150. Although system 100 is shown as having one node device 160, in other implementations, the system 100 may include multiple node devices (e.g., 160). Node device 160 may include a data center, a point-of-sale, a mobile device, or an Internet of things (IoT) device. In some implementations, node device 160 includes a communications device, a fixed location data unit, a mobile location data unit, a mobile phone, a cellular phone, a satellite phone, a computer, a tablet, a portable computer, a display device, a media player, or a desktop computer. Alternatively, or additionally, node device 160 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle or a device integrated within a vehicle, any other device that includes a processor or that stores or retrieves data or computer instructions, or a combination thereof. In other illustrative, non-limiting examples, the system, the device, or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Server 168 may be a repository server and may include or correspond to server 110. In some implementations, server 110 and server 168 may be included in a universal artifact management system. Server 110 and server 168 may execute different environments while sharing security objects 118 (e.g., servers 110 and 168 may form an active-active network).

With respect to user equipment 170, user equipment may include one or more processors 172, memory 174, a communication adapter 176, an input/output adapter 178, a display adapter 180, a user interface adapter 182, and a bus 184. As shown, each of one or more processors 172, such as a central processing unit (CPU), memory 174, communication adapter 176, input/output adapter 178, display adapter 180, and user interface adapter 182 are coupled to/via bus 184. As noted above, one or more components of user equipment 170 may also be included in one or more other devices, such as server 110, to enable and/or support operations and functionality at the other device.

One or more processors 172 may include a CPU or microprocessor, a graphics processing unit ("GPU"), and/or microcontroller that has been programmed to perform the functions of user equipment 170. Implementations described herein are not restricted by the architecture of the one or more processors 172 so long as the one or more processors 172, whether directly or indirectly, support the operations described herein. The one or more processors 172 may be one component or multiple components that may execute the various described logical instructions.

Memory 174 includes read only memory (ROM) 186 and random access memory (RAM) 188. ROM 186 may store configuration information for booting user equipment 170. ROM 186 can include programmable read-only memory (PROM), erasable programmable read-only memory (EPROM), electrically erasable programmable read-only memory (EEPROM), optical storage, or the like. User equipment 170 may utilize RAM 188 to store the various data structures used by a software application. RAM 188 can include synchronous RAM (SRAM), dynamic RAM (DRAM), synchronous dynamic RAM (SDRAM), or the like. ROM 186 and RAM 188 hold user and system data, and both ROM 186 and RAM 188 may be randomly accessed. In some implementations, memory 174 may store the instructions that, when executed by one or more processor 172, cause the one or more processors 172 to perform operations according to aspects of the present disclosure, as described herein.

Communications adapter 176 can be adapted to couple user equipment 170 to a network, which can be one or more of a LAN, WAN, and/or the Internet. Therefore, in some embodiments, server 110 may be accessed via an online portal. The I/O adapter 178 may couple user equipment 170 to one or more data storage devices 190, such as one or more of a hard drive, a solid state storage device, a flash drive, a compact disc (CD) drive, a floppy disk drive, a tape drive, and/or the like. Also, data storage devices 190 can be a separate server coupled to user equipment 170 through a network connection to I/O adapter 178. Display adapter 180 can be driven by one or more processors 172 to control presentation via display device 192. In some implementations, display adapter 180 may display a graphical user interface (GUI) associated with a software or web-based application on display device 192, such as a monitor or touch screen. User interface adapter 182 couples user interface device 194, such as a keyboard, a pointing device, and/or a touch screen to the user equipment 170. The I/O adapter 178 and/or the user interface adapter 182 may, in certain embodiments, enable a user to interact with user equipment 170. Any of devices 172-184 may be physical and/or logical.

The concepts described herein are not limited to the architecture of user equipment 170. Rather, user equipment 170 is provided as an example of one type of computing device that can be adapted to perform the functions of server 110 and/or a user interface device. For example, any suitable processor-based device can be utilized including, without limitation, personal data assistants (PDAs), tablet computers, smartphones, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user equipment 170, or certain components thereof, may reside at, or be installed in, different locations within system 100.

In some implementations, server 110 (and/or server 168) can comprise a server and/or cloud-based computing platform configured to perform operations and/or execute the steps described herein. Accordingly, server 110 (and/or server 168) may include a particular purpose computing system designed, configured, or adapted to perform and/or initiate operations, functions, processes, and/or methods described herein and can be communicatively coupled with a number of end user devices (e.g., user equipment 170), which can be, e.g., a computer, tablet, Smartphone, or other similar end user computing device. Users can interact with server 110 (and/or server 168) using a device via one or more networks, such as network 120, which itself can comprise one or more of a local intranet, a LAN (Local Area Network), a WAN (Wide Area Network), a virtual private network (VPN), and the like. As will be apparent to those of skill in the art, communicative coupling between different devices of system 100 can be provided by, e.g., one or more of wireless connections, a synchronous optical network (SONET) connection, a digital T1, TN, E1 or E3 line, Digital Data Service (DDS) connection, DSL (Digital Subscriber Line) connection, an Ethernet connection, and the like.

Figure 2:
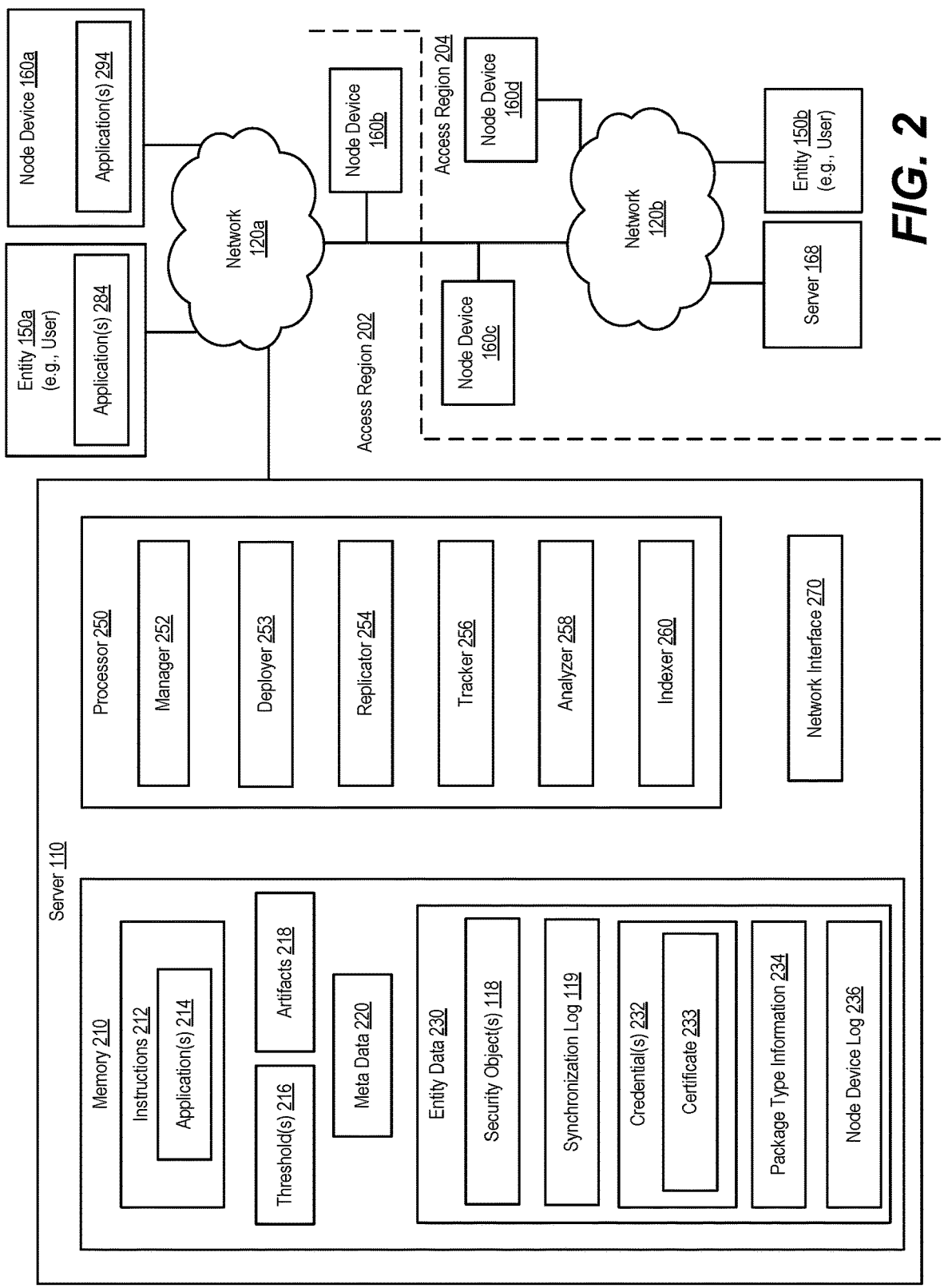
FIG. 2 is a block diagram of another example of a system for synchronization of a security object in an active-active environment.

Referring to FIG. 2, a block diagram of a system for synchronizing security objects in an active-active network according to an embodiment is shown as a system 200. System 200 may include or correspond to at least a portion of system 100. System 200 includes server 110, networks 120a, 120b, entities 150a, 150b, node devices 160a, 160b, 160c, 160d, and server 168. As shown in FIG. 2, system 200 is spread across multiple regions, such as a first region 202 and a second region 204. For example, each region may correspond to a different city, county, state, country, continent, or other physical or logical distinction. To illustrate, first region 202 may include or correspond to North America (e.g., the United States) and second region 204 may include or correspond to Asia (e.g., Japan).

As shown, server 110 is included in first region 202 and server 168 is included in second region 204. Server 168 may be a repository server and may include or correspond to server 110. In some implementations, server 110 and server 168 may be included in a universal artifact management system. Networks 120a, 120b may include or correspond to network 120. Each of the entities 150a, 150b may include or correspond to entity 150. In some implementations, a first entity 150a and a second entity 150b may be part of the same group, company, etc., or may be part of different groups, companies, etc. Each of node devices 160a, 160b, 160c, 160d may include or correspond to node device 160. In some implementations, each of node devices 160a, 160b, 160c, 160d corresponds to the same entity. In other implementations, at least one node device of node devices 160a, 160b, 160c, 160d corresponds to another entity.

Server 110 may include a memory 210 (e.g., one or more memory devices), one or more processors 250, and a network interface 270. Network interface 270 may be configured to be communicatively coupled, via one or more networks (e.g., 120a, 120b) to one or more external devices, such as one or more of entities (e.g., 150a, 150b), one or more node devices (e.g., 160a, 160b, 160c, 160d), one or more servers (e.g., 168), one or more data sources (e.g., 130), or any combination thereof. For example, network interface 270 may include a transmitter, a receiver, or a combination thereof (e.g., a transceiver).

Memory 210 may include ROM devices, RAM devices, one or more HDDs, flash memory devices, SSDs, other devices configured to store data in a persistent or non-persistent state, or a combination of different memory devices. Memory 210 includes (e.g., is configured to store) instructions 212, thresholds 216, artifacts 218 (e.g., binaries), meta data 220, and entity data 230. For example, memory 210 may store instructions 212, that when executed by the one or more processors 250, cause the processor(s) 250 to perform functions, methods, processes, operations as described further herein. In some implementations, instructions 212 may include or be arranged as an application 214 (e.g., a software program) associated with a universal artifact repository. For example, application 214 may provide a portal via which one or more entities and/or users interact with and access server 110. Application 284 at entity 150a and application 294 at node device 160a are configured to enable entity 150a and node device 160a to communicate with and/or access server 110. In some implementations, each of application 284 and application 294 enable functionality as described with respect to server 110. In other implementations, application 284 and application 294 may enable and/or support less than all of the functionality as described with reference to server 110. To illustrate, application 294 may not provide functionality as described with reference to analyzer 258.

In some implementations, memory 210 includes multiple memories accessible by processor 250. In some such implementations, one or more of the memories may be external to server 110. To illustrate, at least one memory may include or correspond to a database accessible to server 110, such as a database that stores one or more thresholds 216, artifacts 218, meta data 220, entity data 230, or any combination thereof. In some implementations, memory 210 may include or be coupled to cloud storage such that one or more thresholds 216, one or more of artifacts 218, meta data 220, and/or entity data 230 is stored at a cloud storage location and accessible by server 110.

Threshold(s) 216 may include or correspond to one or more thresholds, such as a time period threshold, a number of transmission attempts threshold, a number of security object modifications threshold, etc. Artifacts 218 may include or correspond to artifacts 114. Meta data 220 may include meta data for artifacts 114, meta data for application 214, meta data for one or more files (e.g., 116), or any combination thereof. Meta data for an artifact (e.g., a file 116) may include a file name, a file size, a checksum of the file, and/or one or more properties that annotate the artifact, such as when the artifact was created by a build, a build job name, an identifier of who initiate the build, a time the build was initiated, a build agent, a CI server, a build job number, a quality assurance test passed indicator, as illustrative, non-limiting examples.

Entity data 230 may include data associated with one or more entities. For example, entity data 230 may include or correspond to one or more of entity 150a, 150b. Entity data 230 may include one or more security objects 118, synchronization log 119, one or more credentials 232, package type information 234, and a node device log 236. Credential 232 may include login information to enable one or more users and/or one or more entities to access server 110. Additionally, or alternatively, credential 232 may include security or authentication information, such as certificate 233. Certificate 233 may include security or authentication information, such as a private key and/or public key or a token of a user and/or entity. Package type information 234 may identify one or more package types used by the corresponding entity. As illustrative, non-limiting examples, the one or more package types may include Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS. Node device log 236 includes node device information of one or more node devices corresponding to an entity of entity data 230. To illustrate, node device log 236 may include topology information (e.g., location information) of one or more node devices, one or more node device identifiers, owner/manager information, file and/or software information (e.g., name, version number, size, etc.) installed at one or more node devices, or any combination thereof, as illustrative, non-limiting examples. In some implementations, node device log 236 may indicate a list of target nodes at which one or more security objects are to be synchronized.

Processor 250 may include may be a CPU (e.g., processor 172) or microprocessor, a graphics processing unit ("GPU"), a field-programmable gate array (FPGA) device, an application-specific integrated circuits (ASIC), another hardware device, a firmware device, a microcontroller, or any combination thereof that has been programmed to perform the functions. As shown in FIG. 2, in an implementation, server 110 (e.g., processor 250) may include a manager 252, a deployer 253, a replicator 254, a tracker 256, an analyzer 258, and an indexer 260. In some implementations, processor 250 may include one or more modules. For example, each of manager 252, deployer 253, replicator 254, tracker 256, analyzer 258, and indexer 260 may include or correspond to one or more modules. In an implementation, server 110 (e.g., processor 250 or modules 252, 253, 254, 256, 258, 260) may be configured to execute one or more routines that perform various operations as described further herein. A module is "[a] self-contained hardware or software component that interacts with a larger system." Alan Freedman, "The Computer Glossary" 268 (8th ed. 1998). A module may comprise a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

In some implementations, one or more of modules (e.g., 252, 253, 254, 256, 258, 260) may locally reside in memory 210 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Referring to processor 250, manager 252 may be configured to enable a user (e.g., 150a) to manage one or more other components/modules (e.g., 253, 254, 256, 258, 260) of processor 250. Additionally, or alternatively, manager 252 may enable storage of and/or access to one or artifacts 218. In some implementations, manager 252 may enable administration of multiple instances of a user account, such as a first instance at server 110 and a second instance at server 168. Accordingly, manager 252 may be configured to operate as an administrative tool that enables an entity (e.g., 150*a*) to monitor and control a first instance of a user account (corresponding to first region 202) and a second instance of the user account (corresponding to second region 204). For example, the entity (e.g., 150*a*) may be able to see which services (e.g., 253, 254, 256, 258, 260) are operating in different regions, add/modify/remove individual users in different regions, set different permissions for individual users in different regions, provide and store one or more public keys, etc. The entity (e.g., 150*a*) may also be able to initiate synchronization of these security objects (e.g., users, groups, permissions, etc.) from a source node (e.g., server 110) to a target node (e.g., server 168 or another device) due to operations enabled by manager 252, as described further herein. Additionally, manager 252 may enable addition, modification, and/or deletion of one or more security objects 118 and may maintain synchronization log 119. In some implementations, manager 252 includes a manager module that includes one or more routines, executable by one or more processors (e.g., the processor 172 of FIG. 1) or processor 250 to enable a user (e.g., 150*a*) to manage one or more other components/modules (e.g., 253, 254, 256, 258, 260) of processor 250, as described herein.

Deployer 253 may be configured to perform a software release distribution. For example, deployer 253 provides a secure and structured platform to distribute release binaries as a single coherent release bundle to multiple remote locations and update them as new release versions are produced. A release bundle may include one or more files and/or release bundle information which includes or indicates a list of the one or more files (e.g., artifacts) to be included in the release bundle and meta data (e.g., properties) associated with the release bundle. The release bundle information may include, for each file of the bundle release, a checksum (of the file), meta data (corresponding to the file), or both. In some implementations, the release bundle also includes additional meta data (e.g., file name, file size, path to the file, etc.) corresponding to the release bundle, such as a release bundle name, a version number, a source identifier, description information, release date, a size. Additionally, or alternatively, the release bundle information may include a signature (or other cryptography technique) to render the release bundle information immutable.

Deployer 253 may enable generation of a release bundle, auditing and traceability by tracking all changes associated with a release bundle distribution of the release bundle including permission levels release content, scheduling of a release bundle for distribution, tracking of a release bundle, stopping distribution of a release bundle, and/or selection of target destinations. Additionally, or alternatively, a software release may be provisioned amongst one or more nodes devices (e.g., 160*a*, 160*b*, 160*c*, 160*d*). In some implementations, as part of the release flow, release bundles are verified by the source and/or destination to ensure that they are signed correctly and safe to use. In some implementations, deployer 253 includes a deployer module that includes one or more routines, executable by one or more processors (e.g., the processor 172 of FIG. 1) or processor 250 to perform a software release distribution.

Replicator 254 may be configured to coordinate and provide one or more artifacts (e.g., one or more files) and/or meta data between two or more devices. For example, replicator 254 may coordinate transfer of one or more artifacts (e.g., one or more files) and/or meta data between server 110 and server 168, between server 110 and one or more of node devices 160*a*, 160*b*, 160*c*, 160*d*, or both. In some implementations, replicator 254 is configured to be used in conjunction with deployer 253 to distribute a software release, provide efficient network utilization by optimizing replication, and reduce network load and/or release bundle synchronization time from source device (e.g., server 110) to target instance (e.g., server 168) or node device (e.g., 160*a*, 160*b*, 160*c*, 160*d*). Additionally, or alternatively, replicator 254 may be configured to identify a difference between at least one file stored at a first device (e.g., server 110) and one or more files stored at a second device (e.g., server 168 or a node device), and initiate transfer of at least one or more portions of a file to the second device. In some implementations, replicator 254 includes a replicator module that includes one or more routines, executable by one or more processors (e.g., the processor 172 of FIG. 1) or processor 250 to coordinate and provide one or more artifacts (e.g., one or more files) and/or meta data between two or more devices.

Tracker 256 may be configured to track one or more artifacts, meta data, one or more release bundles, or any combination thereof deployed or attempted to be deployed to a node device, such as one or more of node devices 160*a*, 160*b*, 160*c*, 160*d*, a server (e.g., 110, 168), or both. In some implementations, tracker 256 includes a tracker module that includes one or more routines, executable by one or more processors (e.g., the processor 172 of FIG. 1) or processor 250 to track one or more artifacts, meta data, one or more release bundles, or any combination thereof deployed or attempted to be deployed to a node device, such as one or more of node devices 160*a*, 160*b*, 160*c*, 160*d* and/or one or more servers.

Analyzer 258 may be configured to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact). In some implementations, analyzer 258 is configured to analyze data stored at memory 210, identify issues related to deployed software, perform recursive scanning, and perform an impact analysis. In some implementations, analyzer 258 includes an analyzer module that includes one or more routines, executable by one or more processors (e.g., the processor 172 of FIG. 1) or processor 250 to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact).

Indexer 260 may be configured to provide an indexing capability, including maintaining interdependencies and information, for one or more package types. Additionally, or alternatively, indexer 260 is configured to generate meta data (e.g., 220), such as meta data defined by a universal artifact repository manager and utilized by one or more of manager 252, deployer 253, replicator 254, tracker 256, and analyzer 258. In some implementations, indexer 260 includes an indexer module that includes one or more routines, executable by one or more processors (e.g., the processor 172 of FIG. 1) or processor 250 to provide an indexing capability, including maintaining interdependencies and information, for one or more package types.

Figure 3:
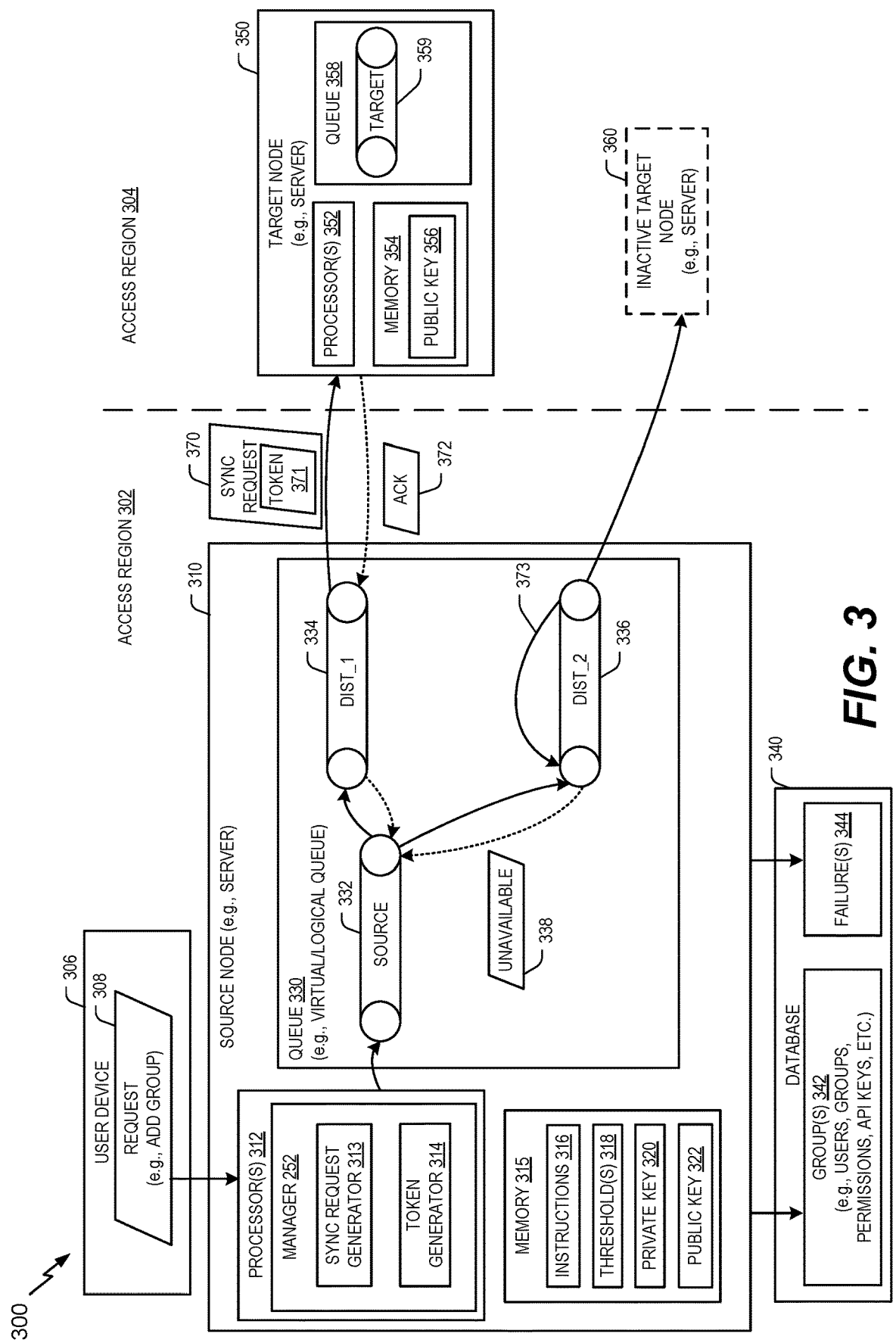
FIG. 3 is a block diagram of another example of a system for synchronization of a security object in an active-active environment.

Referring to FIG. 3, a block diagram of a system for synchronization of a security object is shown and designated 300. System 300 may include or correspond to at least a portion of system 100 and/or system 200. System 300 includes a user device 306, a source node 310, a database 340, a target node 350, and an inactive target node 360. User device 306, source node 310, database 340, target node 350, and inactive target node 360 may be coupled via one or more networks, such as network 120. User device 306 may include or correspond to entity server 140 and/or entity 150, 150a. In a particular implementation, source node 310, target node 350, and inactive target node 360 include or correspond to servers. Source node 310 may include or correspond to server 110. Target node 350 and/or inactive target node 360 may include or correspond to server 168, an intermediate server (e.g., a client server), node device 160, 160a, 160b, 160c, 160d, or a combination thereof.

As shown in FIG. 3, system 300 is spread across multiple regions, such as a first region 302 and a second region 304. For example, each region may correspond to a different city, county, state, country, continent, or other physical or logical distinction. To illustrate, first region 302 may include or correspond to North America (e.g., the United States) and second region 304 may include or correspond to Asia (e.g., Japan). It is noted that the distinction of multiple regions may not be limited to a geographic characterization. To illustrate, the different regions may corresponding to a division or separation between two locations such that network conditions (e.g., network latency and bandwidth limitations) make it impractical or impossible for the two locations to share and/or access the same local development environment.

Source node 310 (e.g., a first access device) includes one or more processors 312 and a memory 315. Processor 312 may include or correspond to processor 250, and memory 315 may include or correspond to memory 210. As shown, processor 312 includes manager 252. Manager 252 includes a sync request generator 313 and a token generator 314. Although manager 252 is described as including sync request generator 313 and token generator 314, in other implementations, one or more of sync request generator 313 and token generator 314 may be distinct from manager 252.

Sync request generator 313 is configured to generate a sync request based on a request 308 from user device 306. Request 308 may indicate one or more security objects that are to be synchronized at one or more target nodes. In some implementations, request 308 may include a user instruction to add, remove, or modify a security object. Sync request generator 313 is configured to generate a sync request to be transmitted to each identified target node that indicates the one or more security objects to be synchronized. Sync request generator 313 can also generate sync requests based on sync requests or other updates received from other devices, as further described with reference to FIG. 4. In some implementations, sync request generator 313 includes a sync generator module that includes one or more routines, executable by one or more processors (e.g., processor 172 of FIG. 1 or processor 250 of FIG. 2) or processor 312 to generate one or more sync requests as described herein.

Token generator 314 is configured to generate one or more tokens. The tokens may be used to secure sync requests sent from source node 310 to target node 350 and inactive target node 360. Tokens can be used for authentication by different instances. For example, tokens may be sent with sync requests to enable authentication of the node that transmits the sync request. In some implementations, tokens include one or more of the following properties: subject (e.g., the user to which an access token is associated, or a transient user if no such user exists), issuer (e.g., an identifier of which node created the token), scope (e.g., the scope of access provided by the token), expiry (e.g., the period of time after creation that the token will expire), refreshable (e.g., whether the token can be refreshed for continued use), and audience (e.g., the set of instances or nodes on which the token may be used, identified by service identifiers). In some implementations, access tokens support cross-instance authentication through a "circle of trust" established by sharing a public certificate among all participating instances, such as the one or more nodes of an active-active environment. In some implementations, token generator 314 includes a token generator module that includes one or more routines, executable by one or more processors (e.g., processor 172 of FIG. 1 or processor 250 of FIG. 2) or processor 312 to generate one or more tokens as described herein.

Memory 315 includes instructions 316, thresholds 318, a private key 320 that corresponds to a public key 356 that is provided to one or more target nodes (e.g., 350, 360), and a public key 322. Instructions 316 are executable by processor 312 to cause processor 312 to perform one or more operations. In some implementations, instructions 316 may include or be arranged as an application, such as application 214 (e.g., a software program), associated with source node 310. Thresholds 318 include one or more thresholds, such as a time period threshold, a number of transmission attempts threshold, a number of security object updates threshold, etc. Thresholds 318 may include or correspond to thresholds 216. Private key 320 corresponds to public key 356. Additionally, in some implementations, memory 315 may also include public key 356. Public key 322 corresponds to a private key of another device and enables authentication of messages received from the other device. Additionally, or alternatively, memory 315 may also store entity data 230 (e.g., security object 118, synchronization log 119, credentials 232, package type information 234, and/or node device log 236), one or more tokens, such as a token corresponding to source node 310, or any combination thereof. Although system 300 is described as including one source node 310, in other implementations, system 300 may include multiple source devices (e.g., 310) coupled to target node 350 and inactive target node 360.

Manager 252 (e.g., processor 312) is also configured to utilize queue 330 (e.g., a distribution structure) for a sync request is to be transmitted to one or more target nodes. For example, manager 252 (e.g., processor 312) may be configured to initialize and maintain queue 330 (e.g., a distribution structure). Queue 330 may include or correspond to one or more virtual or logical queues. For example, queue 330 may include a source queue 332 and one or more distribution queues corresponding to one or more target nodes. In the example of FIG. 3, queue 330 includes a first distribution queue 334 corresponding to target node 350 and a second distribution queue 336 corresponding to inactive target node 360. Each of source queue 332 and distribution queues 334, 336 may include or correspond to virtual or logical queues. Source queue 332 and distribution queues 334, 336 enable buffering and transmission of sync requests and receipt of acknowledgements, as further described herein. Distribution queues 334, 336 may be closed responsive to an acknowledgement from the corresponding target node, as further described herein.

Database 340 is communicatively coupled to source node 310. In some implementations, database 340 is external to source node 310, such as at a cloud server or other device. In other implementations, database 340 may be incorporated within source node 310. For example, database 340 may be coupled to or include in memory 315. Database 340 includes groups 342 (e.g., group data) and failures 344 (e.g., failure data). Groups 342 stores data indicative of one or more security objects. For example, groups 342 stores data indicative of users, groups, permissions, API keys, etc. Failures 344 stores data indicative of sync requests that failed to be received by particular target nodes. For example, if a particular target node fails to acknowledge receipt of a sync request after a threshold amount of time, data indicative of the sync request and the particular target node may be stored as failures 344. In some implementations, failures 344 may include or correspond to synchronization log 119.

Target node 350 (e.g., a second access device) includes one or more processors 352 and a memory 354 (e.g., one or more memories). Memory 354 includes public key 356. Public key 356 may correspond to private key 320. Additionally, memory 354 may include instructions (not shown) that are executable by processor 352 to cause processor 352 to perform one or more operations. In some implementations, the instructions may include or be arranged as an application, such as application 294 (e.g., a software program).

In some implementations, processor 352 includes a manager, which may be similar to manager 252 included in processor 312. The manager (or processor 352) may be configured to initialize and maintain a queue 358, which may be a virtual or logical queue. Queue 358 may include one or more target queues, such as illustrative target queue 359. The target queues may be configured to buffer and transmit a received sync request to a target device, such as node device 160, 160*a*, 160*b*, 160*c*, 160*d*.

Although system 300 is described as including one target node 350, in other implementations, system 300 may include multiple target nodes (e.g., 350) coupled to source node 310. Additionally, or alternatively, it is noted that target node 350 (e.g., processor 352) may include one or more additional components or modules, such as manager 252, as an illustrative, non-limiting example.

System 300 also includes inactive target node 360 (e.g., a third access device). Inactive target node 360 may include one or more processors and a memory (e.g., one or more memories), similar to target node 350. However, inactive target node 360 may be in an inactive state (e.g., a non-operational state, a low-power state, etc.) such that inactive target node 360 is unable to receive or send data to/from other devices or nodes.

During operation of system 300, source node 310 receives request 308 from user device 306 for a synchronization update—e.g., to add, remove, or modify one or more security objections (e.g., 118). For example, request 308 may correspond to an instruction to add a group request. In some implementations, request 308 may indicate one or more target nodes to receive the synchronization update. For example, the one or more target nodes may include or correspond to target node 350 and inactive target node 360.

Responsive to receiving request 308 at source node 310, manager 252 (e.g., sync request generator 313) may generate one or more sync requests to be distributed to the one or more target nodes (e.g., 350, 360). To illustrate, sync request generator 313 may generate a representative sync request 370 to be sent to target node 350. In some implementations, sync request generator 313 may encode sync request 370. For example, sync request generator 313 may encode the sync request by including token 371 in sync request 370. To illustrate, token 371 may correspond to and/or identify source node 310 and may be provided by token generator 314 or may be retrieved from memory 315. Additionally, or alternatively, each sync request may indicate/identify which nodes are to receive the sync request.

Additionally, manager 252 may utilize queue 330 to distribute the sync requests (e.g., 370). For example, manager 252 may initialize source queue 332 (corresponding to request 308) and may initialize, for each target node to receive a sync request, a corresponding distribution queue. To illustrate, manager 252 may initiate a first distribution queue 334 corresponding to target node 350 and may initiate a second distribution queue 336 corresponding to inactive target node 360.

Manager 252 sends sync request 370 via source queue 332 and first distribution queue 334 to target node 350. Target node 350 receives sync request 370 and sends acknowledgement 372 to source node 310 (e.g., via first distribution queue 334). Manager 252 receives acknowledgement 372 (e.g., via first distribution queue 334 and/or via source queue 332) and, responsive to acknowledgment 372, closes first distribution queue 334. Additionally, responsive to receiving an acknowledgement (e.g., acknowledgment 372), manager 252 may update synchronization log (e.g., 119) and/or failures 344, as needed, to indicate sync request 370 was received by target node 350. In some implementations, responsive to receiving acknowledgement 372, manager 252 may determine whether any distribution queues remain open/active. If any distribution queues remain open/active, manager 252 maintains source queue 332. Alternatively, if no distribution queues remain open/active, manager 252 closes source queue 332.

Additionally, manager 252 sends a sync request to inactive target node 360 via source queue 332 and second distribution queue 336. Because no acknowledgement is received (due to inactive target node 360 being inactive), after a threshold amount of time, the sync request is resent, as represented by arrow 373. In some implementations, manager 252 may resend the sync request up to a threshold number of times. In some such implementations, after each time that manager 252 resends the sync request, manager 252 may wait at least a threshold amount of time before sending a next subsequent request—e.g., to determine whether an acknowledgement is received. After expiration of the threshold amount of time and/or after the sync request has been sent a threshold number of times, manager 252 may determine that inactive target node 360 is unavailable, as represented by unavailable message 338. Additionally, responsive to a determination that inactive target node 360 is unavailable, manager 252 may update synchronization log (e.g., 119) and/or failures 344, as needed, to indicate the sync request was not received by inactive target node 360.

In response to the determination that inactive target node 360 is unavailable, manager 252 may close second distribution queue 336. Based on closing a distribution queue (e.g., second distribution queue 336), manager 252 may determine whether any distribution queues remain open/active. If any distribution queues remain open/active, manager 252 maintains source queue 332. Alternatively, if no distribution queues remain open/active, manager 252 closes source queue 332.

In some implementations, manager 252 may generate a notification corresponding to inactive target node 360. For example, manager 252 may generate the notification in response to the determination that inactive target node 360 is unavailable. To illustrate, the notification may be provided to user device 306 and indicate that source node 310 failed to receive an acknowledgement from inactive target node 360.

According to yet another embodiment, a system (e.g., 300) for security object synchronization in an active-active environment is described. The system includes at least one memory (e.g., 315) storing instructions (e.g., 316) and one or more processors (e.g., 312) coupled to the at least one memory. The one or more processors are configured to execute the instructions to cause the one or more processors to receive, at a source node (e.g., 310), a user instruction (e.g., 308). The user instruction includes an instruction to synchronize one or more target nodes executing an instance of an application (e.g., 214, 284, and/or 294). The one or more processors are configured to, in response to receiving the user instruction, identify one or more target nodes (e.g., 350, 360) to receive a security object sync request from the source node. The one or more processors are configured to initiate, at the source node, a distribution structure (e.g., 330). The distribution structure includes a source queue (e.g., 332) and, for each identified target node, a corresponding distribution queue (e.g., 334, 336). The one or more processors are configured to generate, at the source node, for each identified target node, a corresponding security object sync request (e.g., 370). The one or more processors are configured to transmit, via the source queue and a distribution queue corresponding to each identified target node, the corresponding security object sync requests. The one or more processors are further configured to update a synchronization log (e.g., 119) corresponding to each identified target node. Updating the synchronization log includes recording an acknowledgement (e.g., 372) is received from at least one of the identified target nodes.

In some implementations, the source node and each of the one or more target nodes includes a server. Additionally, or alternatively, the active-active environment includes multiple geographic regions, the source node is included in a first geographic region (e.g., 302) of the multiple geographic regions and at least one target node of the one or more target nodes is included in a second geographic region (e.g., 304) distinct from the first geographic region. Additionally, or alternatively, the security object sync request includes a user sync request, a group sync request, a permission sync request, a token sync request, or a combination thereof.

According to another embodiment, a computer program product is described that includes a computer-readable storage device, such as a non-transitory computer-readable storage medium, that includes instructions that, when executed by one or more processors (e.g., 312), cause the one or more processors to perform operations for security object synchronization in an active-active environment. The operations include executing a first routine to identify one or more target nodes (e.g., 350, 360) to receive a security object sync request from a source node (e.g., 310) in an active-active environment. The operations further include executing a second routine to initiate a distribution structure (e.g., 330) from the source node based on the identified one or more target nodes. The distribution structure includes a source queue (e.g., 332) and, for each of the one or more target nodes, a corresponding distribution queue (e.g., 334, 336). The operations also include executing a third routine to generate, four each of the one or more target nodes, a corresponding security object sync request (e.g., 370) based on a synchronization log (e.g., 119) maintained at the source node. The operations include executing a fourth routine to send to each target node of the one or more target nodes the corresponding security object sync request via the source queue and the distribution queue for the target node. The operations further include executing a fifth routine to update the synchronization log for each target node based on whether an acknowledgement (e.g., 372) is received from the target node responsive to the corresponding security object.

In a particular implementation, the distribution structure includes a logical hierarchy of virtual queues. Additionally, or alternatively, the operations may include maintaining a list of one or more groups (e.g., 342), each group corresponding to a target node of the one or more target nodes. Additionally, or alternatively, the operations may include maintaining a list of the one or more target nodes (e.g., 236), each of the one or more target nodes corresponding to a unique identifier. In some such implementations, the operations also include adding a target node to the list of the one of more target nodes, each of the one or more target nodes corresponding to a unique identifier. In some such implementations, the operations to add the target node to the list of the one or more target nodes includes sending, to the target node, a certificate of the source node for storage. In some such implementations, the certificate includes a private key (e.g., 320) or a token (e.g., 371). Additionally, or alternatively, the operations to add the target node to the list of the one or more target nodes further includes creating and storing one or more application program interfaces (APIs). The one or more APIs correspond to a path to the target node, an operation to remove the target node from the list, and/or an operation to perform a synchronization operation with the target node.

Thus, system 300 describes Thus, method 500 describes performing synchronization between a source node and one or more target nodes in an active-active environment. For example, different nodes (e.g., servers) may each work on files in their own environments, and security objects, such as users, groups, permissions, API keys, etc., may be synchronized between each node. Source node 310 may advantageously utilize queue 330 (e.g., a distribution structure) to enable source node 310 to track the sending of sync requests (e.g., 370) and identify which requests have been received. In some implementations, synchronization updates (e.g., sync request 370) may be encoded, such as through use of token 371, to enable authentication and improve security of the synchronization updates. If source node 310 does not receive an acknowledgement (e.g., 372) that an synch request was received by target node 350, source node 310 can resend the sync request. Additionally, a synchronization log (e.g., 119/344) may be maintained to monitor which synchronization requests are received by which nodes. Thus, system 300 enables multiple local development environments of an active-active environment can maintain synchronization of security objections.

Figure 4:
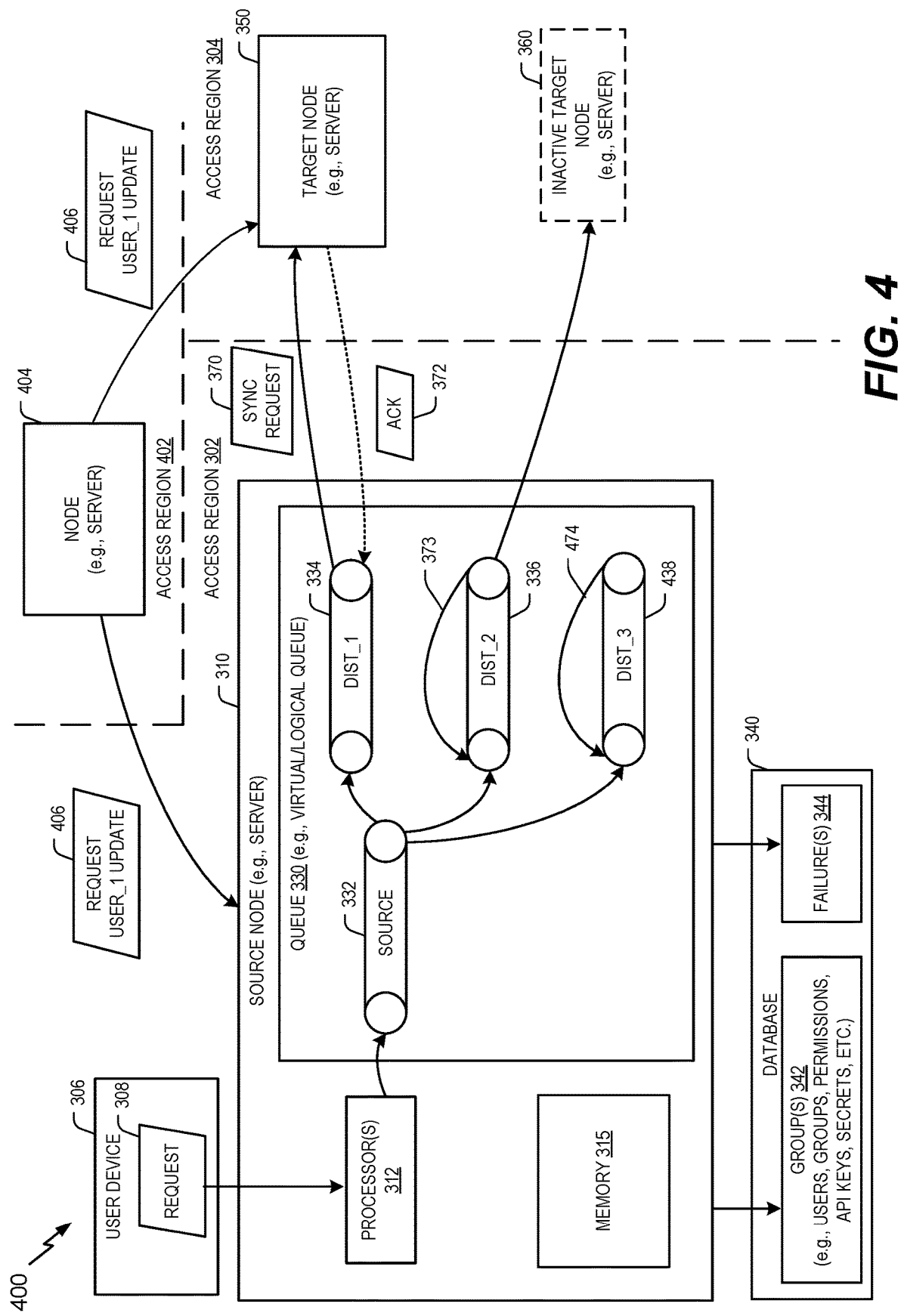
FIG. 4 is a block diagram of another example of a system for synchronization of a security object in an active-active environment.

Referring to FIG. 4, an example of a system for synchronization of a security object in an active-active environment is depicted and generally designated 400. System 400 includes many of the components of system 300. Additionally, system 400 includes a node 404. In a particular implementation, node 404 includes or corresponds to a server. Node 404 is located in a third region 402 that is distinct from first region 302 and second region 304. Each of nodes 310, 350, 360, and 404 may include or correspond to the same entity as part of an active-active environment.

During operation of system 400, source node 310 receives request 308 from user device 306. In some implementations, request 308 identifies nodes 350, 360, and another node (that no longer exists), but does not identify node 404 to receive a synchronization update. Alternatively, in other implementations, request 308 identifies node 404 to also receive the synchronization update.

Responsive to request 308, source node 310 utilizes queue 330, including source queue 332, first distribution queue 334, second distribution queue 336, and third distribution queue 438. In some implementations, source node initializes and maintains queue 330. First distribution queue 334 corresponds to target node 350, second distribution queue 336 corresponds to inactive target node 360, and third distribution queue 438 corresponds to a target node that no longer exists but has not yet been updated in database 340 (or node device log 236). Thus, processor 312 (e.g., manager 252) initializes third distribution queue 438 even though the corresponding target node no longer exists.

As described with reference to FIG. 3, sync request 370 is generated and transmitted via source queue 332 and first distribution queue 334 to target node 350. Target node 350 receives sync request 370 and sends acknowledgement 372 to source node 310 (e.g., via first distribution queue 334). Additionally, a sync request is sent to inactive target node 360 via source queue 332 and second distribution queue 336. Because no acknowledgement is received (due to inactive target node 360 being inactive), after a threshold amount of time, the sync request is resent, as represented by arrow 373. Similarly, a sync request is generated and transmitted via source queue 332 and third distribution queue 438. Because no acknowledgement is received (due to the target node not existing), after a threshold amount of time, the sync request is resent, as represented by arrow 474.

Between the time of sending of the sync messages and expiration of the threshold amount of time, node 404 transmits a request 406 (e.g., a sync request) to source node 310 and target node 350. Request 406 includes a request to synchronize one or more security objects. For example, request 406 may include a request to synchronize the one or more security objects at all nodes of the active-active environment—e.g., the synchronization update is a global update. Source node 310 may receive request 406 and synchronize the one or more security objects at source node 310, in addition to sending an acknowledgement to node 404. Additionally, prior to resending the sync requests (e.g., to inactive target node 360 and to the non-existent target node), source node 310 may modify the sync requests based on request 406. For example, the sync requests may be modified to incorporate a combination of the security objects indicated by request 308 and the security objects indicated by request 406. As an example, if request 308 includes an add user request for user "user_003" and request 406 includes a modify permissions request to remove permissions for group "group_A" to a particular file, the resent sync request may include both requests (e.g., the sync request adds "user_003" and removes permissions for "group_A"). Thus, a single sync request may be sent instead of sending multiple sync requests, which reduces network congestion and bandwidth used in sending the sync requests. If inactive target node 360 were to become active and send an acknowledgement to source node 310, synchronization log 119 may be updated to indicate that request 308 and request 406 were transmitted to inactive target node 360. In some implementations, receipt of an additional request may result in termination of sending of sync requests. For example, if request 308 is to add user "user_003" and request 406 is to remove user "user_003", processor 312 (e.g., manager 252) may determine that the requests cancel each other out, and thus that no sync request needs to be resent (e.g., to inactive target node 360). In this implementation, second distribution queue 336 and third distribution queue 438 may be closed. Additionally, synchronization log 119 may be updated to indicate that request 308 and request 406 were transmitted to inactive target node 360.

Target node 350 may receive sync request 370 and request 406 and perform conflict resolution to determine which security objects to synchronize without contacting either source node 310 or node 404. To illustrate, target node 350 may determine a first time that sync request 370 was generated (e.g., based on a timestamp) and a second time that request 406 was generated (e.g., based on a timestamp). In an example, the first time is before the second time, thus, target node 350 identifies sync request 370 as "older" and identifies request 406 as "most recent." Target node 350 also identifies a difference between the first time and the second time. In some implementations, target node 350 compares the difference to a threshold (e.g., one second, multiple seconds, thirty seconds, one minutes, etc.). If the difference is less than or equal to the threshold, target node 350 applies sync request 370 and discards request 406. Alternatively, if the difference is greater than the threshold, target node 350 applies sync request 370 followed by request 406. In some situations, target node 350 may receive the "most recent" request before the "older request." For example, due to network conditions, target node 350 may receive request 406 before sync request 370 is received. If target node 350 has already applied request 406 prior to receiving sync request 370, target device may selectively apply sync request 370 based on request 406, or target node 350 may apply sync request 370 followed by reapplying request 406. Thus, target node 350 may be able to resolve conflicts based on times when the requests where generated/transmitted without contacting source node 310 or node 404.

Thus, system 400 describes that nodes (e.g., 310, 350, 360, 404) of the active-active environment may be synchronized in time to advantageously enable the nodes to resolve conflicts between received security object updates initiated from two different nodes, such as source node 310 and node 404. Additionally, a synchronization log (e.g., 119) may be maintained to monitor/track which synchronization updates are received by which nodes. In some such implementations, resending of the sync request may advantageously incorporate and/or account for an additional synchronization update, such as request 406, which may reduce transmission overhead between nodes. Additionally, or alternatively, in implementations where source node 310 and the target nodes (e.g., 350, 360) are part of an active-active environment and are synchronized in time, one or more nodes (e.g., target node 350) may beneficially be able to resolve, without contacting another node, conflicts between multiple received security object updates initiated from two different nodes based on indications of when the multiple received security object updates were generated/transmitted. Thus, synchronization of security objections can be maintained across multiple local development environments of an active-active environment in situations where bandwidth limitation and/or latency of a network are present. Accordingly, users of different nodes (e.g., servers) may each work on files in their own environments, and security objects, such as users, groups, permissions, API keys, etc., may be synchronized between each node.

Although particular operations have been described with reference to particular elements of FIGS. 3-4, so operations are illustrative and in other implementations, may be performed by other devices. For example, target node 350 may receive a user instruction and generate and transmit a sync request to source node 310. Source node 310 may synchronize one or more security objects based on the sync request and send an acknowledgement to target node 350, which may update a synchronization log based on the acknowledgement. Additionally, or alternatively, each of source node 310 and target node 350 may perform conflict resolution when multiple sync requests are received.

Figure 5:
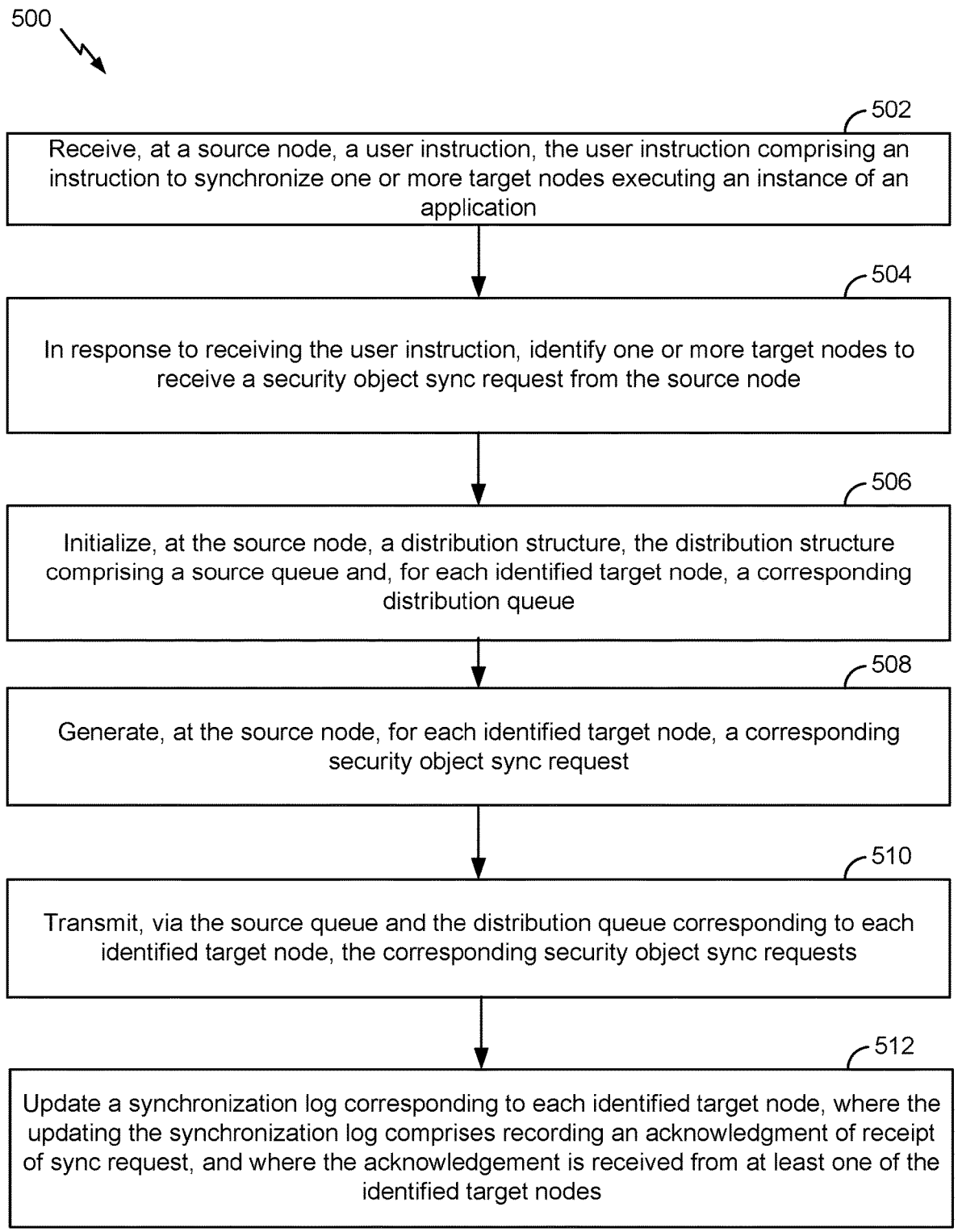
FIG. 5 is a flow diagram of an example of a method for synchronizing a security object in an active-active environment.

FIG. 5 is a flow diagram of a method for synchronizing a security object in an active-active environment according to an embodiment is shown as a method 500. The method 500 may be stored in a computer-readable storage medium as instructions that, when executed by one or more processors, cause the one or more processors to perform the operations of the method 500. In a particular implementation, method 500 may be performed by server 110 (e.g., one or more processors 250 and/or manager 252), server 168 (e.g., a processor and/or a module), and/or source node 310.

At 502, method 500 includes receiving, at a source node, a user instruction. The user instruction includes an instruction to synchronize one or more target nodes executing an instance of an application. For example, source node 310 may receive a user instruction, such as request 308, to synchronize one or more target nodes that execute an instance of an application, such as an artifact repository application.

At 504, method 500 includes, in response to receiving the user instruction, identifying one or more target nodes to receive a security object sync request from the source node. For example, source node 310 may identify target node 350 and inactive target node 360 to receive a security object sync request.

At 506, method 500 includes initializing, at the source node, a distribution structure. The distribution structure includes a source queue and, for each identified target node, a corresponding distribution queue. For example, source node 310 may initialize queue 330 that includes source queue 332 and distribution queues 334, 336.

At 508, method 500 includes generating, at the source node, for each identified target node, a corresponding security object sync request. For example, source node 310 may generate sync request 370 and a corresponding sync request for inactive target node 360.

At 510, method 500 includes transmitting, via the source queue and the distribution queue corresponding to each identified target node, the corresponding security object request. For example, source node 310 may transmit sync request 370 via source queue 332 and first distribution queue 334 to target node 350. Source node 310 may also transmit a sync request via source queue 332 and second distribution queue 336 to inactive target node 360.

At 512, method 500 further includes updating a synchronization log corresponding to each identified target node. The updating the synchronization log includes recording an acknowledgement of receipt of sync request, and the acknowledgement is received from at least one of the identified target nodes. For example, source node 310 may receive acknowledgement 372 from target node 350, and source node 310 may update a synchronization log (e.g., synchronization log 119).

In a particular implementation, the user instruction contains an identification of each target node to receive the security object sync request from the source node. For example, request 308 (e.g., a user instruction) may include identification of target node 350 and inactive target node 360. Additionally, or alternatively, the security object sync request includes an add group request, a delete group request, a modify group request, an add user request, a delete user request, a modify user request, an add key request, a remove key request, an add permissions request, a remove permissions request, a modify permissions request, or any combination thereof.

In a particular implementation, method 500 includes generating a first sync request for a first target node of the identified target nodes. Generating the first sync request includes identifying a most recent synchronization update of the first target node and determining if at least one synchronization update was requested between the most recent synchronization update and receipt of the user instruction. For example, source node 310 generates sync request 370 by identifying a most recent synchronization update for target node 350 and determining if at least one synchronization update was requested between the most recent synchronization update and receipt of request 308. In some such implementations, the first sync request for the first target node includes update data corresponding to the user instruction and the at least one synchronization update. For example, sync request 370 may include update data corresponding to request 308 and to request 406 if request 406 was received between the most recent synchronization update and receipt of request 308. Additionally, or alternatively, identifying the most recent synchronization update of the first target node includes determining a first time value corresponding to the most recent synchronization update and determining a second time value corresponding to receipt of the user instruction. For example, source node 310 may determine a first time value corresponding to the most recent synchronization update and a second time value corresponding to receipt of request 308. In some such implementations, determining if the at least one synchronization update was requested between the most recent synchronization update and receipt of the user instruction includes comparing the first time value to the second time value. For example, source node 310 may compare the first time value to the second time value to determine whether that at least one synchronization update was requested before the most recent synchronization update. Additionally, or alternatively, the source node and each of the one or more target nodes may be synchronized in time. For example, source node 310 and target node 350 may perform one or more clock synchronization operations at various times (e.g., periodically, at designated times, etc.).

In some such implementations, the first sync request causes the first target node to initiate a target queue. For example, responsive to receipt of sync request 370, target node 350 may initiate target queue 359. Additionally, or alternatively, method 500 may further include, prior to sending the first sync request for a first target node, encoding the first sync request with a certificate of the source node. The certificate of the source node may include a token or a private key of the source node, as non-limiting examples. For example, the certificate may include token 371. Alternatively, the certificate may include private key 320.

In a particular implementation, method 500 also includes, for a first target node of the one or more target nodes corresponding to a first distribution queue, determining whether an acknowledgement is received from the first target node via the first distribution queue responsive to the security object sync request. For example, source node 310 may determine whether acknowledgement 372 has been received via distribution queue 334 responsive to sync request 370. In some such implementations, method 500 further includes, responsive to a determination that the acknowledgement is not received from the first target node: determining an amount of time that has elapsed since the security object sync request was sent, comparing the amount of time to a threshold, and, in response to the amount of time being greater than or equal to the threshold, resending the security object sync request to the first target node. For example, responsive to an acknowledgement not being received from inactive target node 360 and an amount of time since a sync request was sent being greater than or equal to a threshold, the sync request may be resent, as indicated by arrow 373.

Additionally, or alternatively, method 500 may include, responsive to a determination that the acknowledgement is not received from the first target node: determining whether an additional request is received at the source node after sending the security object sync request to the first target node, in response to a determination that the additional request is received for the first target node: updating the security object sync request based on the additional request to generate an updated security object sync request and sending, by the one or more processors, the updated security object sync request to the first target node. For example, source node 310 may determine that an additional request (e.g., request 406) is received and may update the sync request to generate an updated sync request based on the additional request. Additionally, or alternatively, method 500 may include, responsive to a determination that the acknowledgement is not received from the first target node: determining a number of times the security object sync request has been sent without acknowledgement, performing a comparison between the number of times and a threshold, and, in response to the number of times being greater than or equal to the threshold, determining that the target node is inactive. For example, source node 310 may determine that inactive target node 360 is inactive by determining that a number of times a security object sync request has been sent to inactive target node 360 is greater than or equal to a threshold. After determining that inactive target node 360 is inactive, information indicating the sync request (e.g., the updated data to be stored at inactive target node 360) may be stored as failures 344 at database 340.

In a particular implementation, method 500 also includes maintaining a list of one or more groups, each group corresponding to a target node of the one or more target nodes. For example, source node 310 may maintain a list of groups 342 in database 340. Additionally, or alternatively, method 500 also includes maintaining a list of the one or more target nodes, each of the one or more target nodes corresponding to a unique identifier. For example, source node 310 may maintain node device log 236. In some such implementations, method 500 includes adding a target node to the list of the one or more target nodes, each of the one or more target nodes corresponding to a unique identifier. For example, source node 310 may add a node to node device log 236. In some such implementations, adding the target node to the list of one or more target nodes includes sending, to the target node, a certificate of the source node for storage. The certificate may include a private key of the source node or a token. For example, the certificate may include private key 320 or token 371. Additionally, or alternatively, adding the target node to the list of one or more target nodes includes creating and storing one or more application program interfaces (APIs). The one or more APIs correspond to a path to the target node, an operation to remove the target node from the list, and/or an operation to perform a synchronization operation with the target node. For example, source node 310 may store one or more APIs corresponding to target node 350.

Thus, method 500 describes performing synchronization between a source node and one or more target nodes in an active-active environment. Thus, users of different nodes (e.g., servers) may each work on files in their own environments, and security objects, such as users, groups, permissions, API keys, etc., may be synchronized between each node. Additionally, in some implementations, synchronization updates may be encoded, such as through use of a token, to enable authentication and improve security of the synchronization updates. In some implementations of method 500, nodes of the active-active environment may be synchronized in time to advantageously enable the nodes to resolve conflicts between received security object updates initiated from two different nodes. Method 500 further provides that if a source node does not receive an acknowledgement that a synchronization update was received by a target node, the source node can resend the synchronization update. In some implementations, sending and/or resending of the synchronization update may incorporate and/or account for an additional synchronization update, which may reduce transmission overhead between nodes and promote network efficiency. Additionally, a synchronization log may be maintained to monitor which synchronization updates are received by which nodes. Thus, method 500 provides several benefits such that multiple local development environments of an active-active environment can maintain synchronization of security objections.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for security object synchronization in an active-active environment, the method comprising:
   initializing, at a source node, a distribution structure, the distribution structure comprising a source queue and, for each of one or more target nodes identified to receive a security object sync request from the source node, a corresponding distribution queue;
   transmitting, via the source queue and a first distribution queue corresponding to a first target node of the one or more target nodes, a first security object sync request corresponding to the first target node, the first security object sync request corresponding to a first security object;
   receiving an additional security object sync request from a node prior to expiration of an acknowledgement threshold, the additional security object sync request corresponding to an additional security object;
   updating the first security object sync request based on the additional security object sync request to generate an updated security object sync request that corresponds to the first security object and the additional security object; and
   transmitting, via the source queue and the first distribution queue, the updated security object sync request to the first target node.

2. The method of claim 1, where the updated security object sync request includes update data corresponding to the first security object sync request and to the additional security object sync request.

3. The method of claim 1, further comprising:
   receiving, at the source node, a user instruction, the user instruction comprising an instruction to synchronize the one or more target nodes executing an instance of an application, where the distribution structure is initialized based on receipt of the user instruction; and
   determining whether the additional security object sync request was requested between transmission of the first security object sync request and expiration of the acknowledgement threshold.

4. The method of claim 3, where the user instruction contains an identification of each target node to receive the security object sync request from the source node.

5. The method of claim 1, further comprising:
   receiving an acknowledgement of receipt of the updated security object sync request from the first target node via the first distribution queue; and
   updating a synchronization log corresponding to the first target node, where updating the synchronization log comprises recording the acknowledgment of receipt of the updated security object sync request.

6. The method of claim 1, where the security object sync request comprises an add group request, a delete group request, a modify group request, an add user request, a delete user request, a modify user request, an add key request, a remove key request, an add permissions request, a remove permissions request, a modify permissions request, or any combination thereof.

7. The method of claim 1, where the source node and each of the one or more target nodes are synchronized in time.

8. The method of claim 1, further comprising:
   prior to transmitting the first security object sync request to the first target node, encoding the first security object sync request with a certificate of the source node.

9. The method of claim 8, where the certificate of the source node comprises a token or a private key of the source node.

10. The method claim 1, further comprising:
    receiving an acknowledgement of receipt of the updated security object sync request from the first target node via the first distribution queue; and
    closing the first distribution queue based on receipt of the acknowledgement.

11. The method of claim 10, further comprising closing the source queue based on a determination that no distribution queue remains active.

12. The method of claim 1, further comprising:
    responsive to a determination that an acknowledgement responsive to the first security object sync request is not received from the first target node via the first distribution queue:
       determining an amount of time that has elapsed since the first security object sync request was sent; and
       comparing the amount of time to the acknowledgement threshold, where the updated security object sync request is transmitted in response to the amount of time being greater than or equal to the acknowledgement threshold.

13. The method of claim 1, further comprising:
    responsive to a determination that an acknowledgement responsive to the updated security object sync request is not received from the first target node via the first distribution queue:
       determining a number of times the updated security object sync request has been transmitted without acknowledgement;
       performing a comparison between the number of times and a threshold; and
       in response to the number of times being greater than or equal to the threshold, determining that the first target node is inactive.

14. A system for security object synchronization in an active-active environment, the system comprising:
    at least one memory storing instructions; and
    one or more processors coupled to the at least one memory, the one or more processors configured to execute the instructions to cause the one or more processors to:
       initialize, at a source node, a distribution structure, the distribution structure comprising a source queue and, for each of one or more target nodes identified to receive a security object sync request from the source node, a corresponding distribution queue;
       send, via the source queue and a first distribution queue corresponding to a first target node of the one or more target nodes, a first security object sync request corresponding to the first target node, the first security object sync request corresponding to a first security object;
       receive an additional security object sync request from a node prior to expiration of an acknowledgement threshold, the additional security object sync request corresponding to an additional security object;

update the first security object sync request based on the additional security object sync request to generate an updated security object sync request that corresponds to the first security object and the additional security object; and send, via the source queue and the first distribution queue, the updated security object sync request to the first target node.

15. The system of claim 14, where the source node and each of the one or more target nodes comprises a server.

16. The system of claim 14, where:
the active-active environment comprises multiple geographic regions;
the source node is included in a first geographic region of the multiple geographic regions; and
the first target node is included in a second geographic region distinct from the first geographic region.

17. A non-transitory computer-readable storage medium storing instructions that, when executed by one or more processors, cause the one or more processors to perform operations for security object synchronization in an active-active environment, the operations comprising:

executing a first routine to initialize a distribution structure, the distribution structure comprising a source queue and, for each of one or more target nodes identified to receive a security object sync request from a source node, a corresponding distribution queue;

executing a second routine to transmit, via the source queue and a first distribution queue corresponding to a first target node of the one or more target nodes, a first security object sync request corresponding to the first target node, the first security object sync request corresponding to a first security object;

executing a third routine to receive an additional security object sync request from a node prior to expiration of an acknowledgement threshold, the additional security object sync request corresponding to an additional security object;

executing a fourth routine to update the first security object sync request based on the additional security object sync request to generate an updated security object sync request that corresponds to the first security object and the additional security object; and executing a fifth routine to transmit, via the source queue and the first distribution queue, the updated security object sync request to the first target node.

18. The non-transitory computer-readable storage medium of claim 17, where the distribution structure comprises a logical hierarchy of virtual queues.

19. The non-transitory computer-readable storage medium of claim 17, where the operations further comprise:
maintaining a list of the one or more target nodes, each of the one or more target nodes corresponding to a unique identifier.

20. The non-transitory computer-readable storage medium of claim 19, where the operations further comprise:
adding a target node to the list of the one or more target nodes, each of the one or more target nodes corresponding to a unique identifier; and
creating and storing one or more application program interfaces (APIs), the one or more APIs corresponding to a path to the target node, an operation to remove the target node from the list, an operation to perform a synchronization operation with the target node, or a combination thereof.

\* \* \* \* \*